(12) United States Patent
Missotten et al.

(10) Patent No.: US 9,008,918 B2
(45) Date of Patent: Apr. 14, 2015

(54) METHOD AND DEVICE FOR PREDICTIVE CONTROL OF AGRICULTURAL VEHICLE SYSTEMS

(75) Inventors: Bart M. A. Missotten, Winksele (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/809,813

(22) PCT Filed: Jul. 14, 2011

(86) PCT No.: PCT/EP2011/062057
§ 371 (c)(1),
(2), (4) Date: Mar. 13, 2013

(87) PCT Pub. No.: WO2012/007549
PCT Pub. Date: Jan. 19, 2012

(65) Prior Publication Data
US 2013/0184944 A1      Jul. 18, 2013

(30) Foreign Application Priority Data
Jul. 14, 2010    (BE) .................................. 2010/0435

(51) Int. Cl.
| | | |
|---|---|---|
| G01C 21/00 | (2006.01) | |
| A01B 69/00 | (2006.01) | |
| A01D 41/127 | (2006.01) | |
| A01D 75/28 | (2006.01) | |

(52) U.S. Cl.
CPC ............... *A01B 69/00* (2013.01); *A01B 69/007* (2013.01); *A01D 41/127* (2013.01); *A01D 75/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,967,362 A | | 10/1990 | Schetten et al. | |
| 5,751,576 A | * | 5/1998 | Monson ........................... | 700/83 |
| 5,978,723 A | * | 11/1999 | Hale et al. ........................ | 701/50 |
| 5,995,895 A | * | 11/1999 | Watt et al. ........................ | 701/50 |
| 5,995,902 A | * | 11/1999 | Monson ........................... | 701/468 |
| 6,009,354 A | * | 12/1999 | Flamme et al. ................. | 700/184 |
| 6,024,035 A | * | 2/2000 | Flamme ......................... | 111/178 |
| 6,061,618 A | * | 5/2000 | Hale et al. ........................ | 701/50 |
| 6,070,538 A | * | 6/2000 | Flamme et al. ................. | 111/170 |
| 6,091,997 A | * | 7/2000 | Flamme et al. ................. | 700/83 |
| 6,141,614 A | * | 10/2000 | Janzen et al. .................... | 701/50 |
| 6,236,916 B1 | * | 5/2001 | Staub et al. ...................... | 701/23 |
| 6,236,924 B1 | * | 5/2001 | Motz et al. ...................... | 701/50 |
| 6,336,051 B1 | * | 1/2002 | Pangels et al. .................. | 700/50 |
| 6,490,539 B1 | * | 12/2002 | Dickson et al. ................. | 702/150 |
| 6,819,780 B2 | * | 11/2004 | Benson et al. .................. | 382/104 |
| 6,876,920 B1 | * | 4/2005 | Mailer ........................... | 701/470 |
| 6,937,939 B1 | * | 8/2005 | Shibusawa et al. ............. | 702/22 |

(Continued)

*Primary Examiner* — Jonathan M Dager
(74) *Attorney, Agent, or Firm* — Patrick M. Sheldrake; Seyed V. Sharifi T.

(57) ABSTRACT

A method for controlling an agricultural vehicle system when moving along a course of travel over a field providing a field model correlating a field characteristic, e.g. a farmland condition such as farmland slope, or a crop condition such as crop density or moisture, to a specific location in the field, from the field model and at least one previously obtained value for the field characteristic, predicting a value for the field characteristic in front of the agricultural vehicle system thus obtaining an anticipated field characteristic, and;

controlling the agricultural vehicle system at least partly in response to the anticipated field characteristic.

13 Claims, 10 Drawing Sheets

(56) References Cited

U.S. PATENT DOCUMENTS

| | | | |
|---|---|---|---|
| 7,502,678 B2 * | 3/2009 | Diekhans et al. | 701/50 |
| 7,756,623 B2 * | 7/2010 | Jarrett et al. | 701/50 |
| 7,835,832 B2 * | 11/2010 | Macdonald et al. | 701/24 |
| 8,224,516 B2 * | 7/2012 | Anderson | 701/23 |
| 8,386,129 B2 * | 2/2013 | Collins et al. | 701/41 |
| 8,463,436 B2 * | 6/2013 | Jeong et al. | 700/253 |
| 2002/0106108 A1 * | 8/2002 | Benson et al. | 382/104 |
| 2004/0068352 A1 * | 4/2004 | Anderson | 701/25 |
| 2004/0193348 A1 * | 9/2004 | Gray et al. | 701/50 |
| 2004/0193349 A1 * | 9/2004 | Flann et al. | 701/50 |
| 2005/0055147 A1 * | 3/2005 | Hrazdera et al. | 701/50 |
| 2006/0178823 A1 * | 8/2006 | Eglington et al. | 701/210 |
| 2006/0178825 A1 * | 8/2006 | Eglington et al. | 701/211 |
| 2006/0282205 A1 * | 12/2006 | Lange | 701/50 |
| 2007/0021913 A1 * | 1/2007 | Heiniger et al. | 701/213 |
| 2008/0103690 A1 * | 5/2008 | Dix | 701/207 |
| 2008/0103694 A1 * | 5/2008 | Dix et al. | 701/213 |
| 2008/0105177 A1 * | 5/2008 | Dix et al. | 111/200 |
| 2008/0215203 A1 * | 9/2008 | Dix et al. | 701/26 |
| 2008/0249692 A1 * | 10/2008 | Dix | 701/50 |
| 2009/0037041 A1 * | 2/2009 | Senneff et al. | 701/23 |
| 2010/0017075 A1 * | 1/2010 | Beaujot | 701/50 |
| 2013/0095899 A1 * | 4/2013 | Knapp | 460/111 |

* cited by examiner

METHOD AND DEVICE FOR PREDICTIVE CONTROL OF AGRICULTURAL VEHICLE SYSTEMS

FIELD OF THE INVENTION

The present invention relates generally to control of agricultural vehicle systems. In particular, the present invention relates to methods and devices for, based on location coordinates and field characteristics collected from an already worked area during a previous pass, predicting which working conditions the agricultural vehicle system will encounter while working a next pass in the field.

BACKGROUND OF THE INVENTION

In recent years control systems have been used to alleviate the task of operators of agricultural vehicle systems. Automation allows an operator to concentrate on other tasks such as coordinating transport. Moreover, such control systems guarantee constant performance throughout the day whereas an operator gets tired.

Control systems on agricultural vehicle systems can only take into account information collected by the agricultural vehicle system at a time t in the past. However, an experienced operator looks ahead and estimates from a previous pass what the machine behavior at a next location might be. A good control system should also anticipate on e.g. the crop condition, just like an experienced operator would. The operator may make a visual assessment of the condition in terms of, for example and amongst others, crop density in front of the machine and/or farmland slope, and acts upon it.

At present, automatic control systems do not have this upfront information, which makes it hard to have an automated system that is as efficient as an experienced operator. A lot of research has been performed into sensors to measure the harvest condition in front of the machine.

U.S. Pat. No. 5,995,895 describes a control system in which a predetermined geo-referencing map is stored in a memory circuit, the geo-referencing map including site-specific spatially-variable map data indicative of anticipated conditions along the course of travel which may affect the engine load. The control system calculates the anticipated condition using at least actual location signals and the stored map data, and generates a control signal based at least upon the anticipated condition. It is a disadvantage of this system that the geo-referencing data has to be available, either from a previous pass with the same vehicle over the field (geo-referencing data stored when vehicle passed over the field during a previous season for example), or from a pass with another vehicle over the same field (in which case the geo-referencing data needs to be transferred from one vehicle to another).

DE19528663 describes a method for controlling an agricultural vehicle system, which is provided with at least one measurement device for determining its position, and at least one further measurement device for determining a control value for controlling the operation of the agricultural vehicle system. The method controls the action of the vehicle system itself, e.g. its speed, by taking into account at least one predicted process variable and/or area feature, wherein during the calculation of the at least one predicted value, use is made of at least one previously recorded measurement at a particular location. For the prediction of the process variable and/or area feature at a location X, all measurement values of this process variable and/or area feature already obtained before within a range with predetermined radius around location X are taken into account. Different possibilities are set out. In one embodiment, the predicted value may be a mean value of the already measured values within the range. In another embodiment, a weighted value of already measured values within the range may be built whereby different weights are assigned to different measured values depending on their distance from location X within the pre-determined range, taking into account the direction of the change of the measurement values. In yet another embodiment, the prediction may be done solely on the basis of a measurement value of a location adjacent the location of which the prediction is to be made. It is a disadvantage of the model used in DE19528663 that predictions are not accurate enough.

There is room for improved control systems for agricultural vehicle systems.

SUMMARY OF THE INVENTION

It is an object of embodiments of the present invention to provide a good method and device for controlling an agricultural vehicle system.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a first aspect, the present invention provides a method for controlling an agricultural vehicle system when moving along a course of travel over a field.

The method comprises:

providing a field model correlating a field characteristic, e.g. a farmland condition such as farmland slope, or a crop condition such as crop density or moisture, to a specific location in the field, for example indicated by x and y coordinates, from the field model and at least one previously obtained value for the field characteristic, predicting a value for the field characteristic in front of the agricultural vehicle system thus obtaining an anticipated field characteristic, and controlling the agricultural vehicle system at least partly in response to the anticipated field characteristic.

In accordance with embodiments of the present invention, providing a field model correlating a field characteristic to a specific location in the field includes assuming that the field characteristic varies in a continuous manner.

It is an advantage of a method according to embodiments of the present invention that a better field model and better predictions are obtained by removing effects of noise and/or disturbances. Furthermore, it is advantageous that a method according to embodiments of the present invention yields good results without it being necessary to have data from a previous pass of this or another agricultural vehicle system available.

In a method according to embodiments of the present invention, wherein the field model comprises field model variables, assuming that the field characteristic varies in a continuous manner may comprise taking into account first and second order derivatives of the field model variables. This way, it is possible to model that in nature the curve of any object varies as little as possible and that in nature curves also vary smoothly. In particular embodiments of the present invention, providing a field model describing a field characteristic may comprise optimizing a cost function that takes account of the difference between a model value and a measured value at a specific location, of the first derivatives in orthogonal directions of the model values and of the second derivatives in orthogonal directions of the model values. Advantageously, the method of providing the field model may comprise summing a factor related to the squared difference between a model value and a measured value at an element, a factor related to the squared first derivative in orthogonal directions of the model values and a factor related to the squared second derivatives in orthogonal directions of the model values. Providing a field model may comprise weighting the factors before summing. This allows to smooth the result. Weighting the factors before summing may be performed by introducing weighting parameters. Suitable weighting parameters may be determined by trial and error.

In accordance with embodiments of the present invention, predicting a value for the field characteristic in front of the agricultural vehicle system may comprise calculating field characteristic values in a region around a current location of the agricultural vehicle system determined by a span not larger than 6, for example a span not larger than 3. The span is related to computation time; a limited span means a faster calculation and less calculation power needed, and hence allows to perform the calculation on-line. This is advantageous as an agricultural vehicle system can do measurements and on-line calculations in a field it never visited before, and still anticipate very well on potential changes in field characteristic.

In a method according to embodiments of the present invention, predicting a value for the field characteristic in front of the agricultural vehicle system may comprise updating the model of the field as new measurements become available. This way, the model values, i.e. predicted values, will become more and more accurate, and hence the behavior of the agricultural vehicle system based on these predicted values will be better.

A method according to embodiments of the present invention may furthermore comprise fitting a grid over the field, the grid consisting of a plurality of elements, and determining a value for the field characteristic of the elements of the grid. This way, continuous measurements and calculations in the continuous domain may be converted into discrete measurements and calculations in the discrete domain, thus reducing the required calculation power. In particular embodiments of the present invention, fitting a grid over the field may comprise fitting a grid over the field with a resolution determined by the working width of an appliance of the agricultural vehicle system. In such embodiments, the resolution may for example be substantially equal to the width of the appliance, or may be an integer multiple of the width of the appliance, or the width of the appliance may be an integer multiple of the resolution. In alternative embodiments, the grid fit over the field may have a resolution which is not related to the width of an appliance of the agricultural vehicle system. In the case of a combine harvester this appliance may comprise a header, such as a grain or corn header, which cuts the crop from the field and supplies it centrally to a feeder mechanism of the harvester.

In a second aspect, the present invention provides a computer program product for executing any of the methods of embodiments of the first aspect of the present invention when executed on a computing device associated with an agricultural vehicle device. Accordingly, the present invention includes a computer program product which provides the functionality of any of the methods according to the first aspect of the present invention when executed on a computing device associated with an agricultural vehicle device.

The present invention also provides a machine readable data storage (data carrier) such as a CD-ROM, a memory key or a diskette which stores the computer product in a machine readable form and which executes at least one of the methods of the invention when executed on a computing device. Nowadays, such software is often offered on the Internet or a company Intranet for download, hence the present invention includes transmitting the agricultural vehicle system computer product according to embodiments of the present invention over a local or wide area telecommunications network. The computing device may include one of a microprocessor and an FPGA.

One embodiment is a method for controlling an agricultural vehicle system, implemented as a computer program that runs on a computer processing system. The computer program may be part of a computer software product (i.e. a carrier medium) that includes one or more code segments that cause a processor such as a CPU of the processing system to carry out the steps of the method. The program runs under an operating system, and may include a user interface that enables a user to interact with the program. The control program operates on input data and generates predicted field characteristic values for controlling the agricultural vehicle system.

In a further aspect, the present invention provides an agricultural vehicle system adapted for being controlled by a control signal generated based on a predicted value for a field characteristic in front of the agricultural vehicle system, the predicted value being calculated from a field model correlating the field characteristic to a specific location in the field and at least one previously obtained value for the field characteristic, wherein the field model assumes that the field characteristic varies in a continuous manner. It is an advantage of an agricultural vehicle system according to embodiments of the present invention that, although the agricultural vehicle system does not need to rely on sensors being mounted to scan field characteristics ahead of the agricultural vehicle system when in use, that it nevertheless provides good means for controlling the agricultural vehicle system with respect to the predicted values for the field characteristic. It is an advantage of the agricultural vehicle system according to embodiments of the present invention that it guarantees constant performance throughout the field and over time.

An agricultural vehicle system according to embodiments of the present invention may furthermore comprise a control system for controlling a vehicle system driving parameter, such as e.g. vehicle or engine speed or transmission ratio, or a vehicle system attribute parameter, such as e.g. rotor speed, sieve opening size, cleaning fan speed or fertilizer flow. The control system may be adapted for generating the control signal.

An agricultural vehicle system according to embodiments of the present invention may furthermore comprise a sensor unit for measuring the field characteristic, for example the sensor unit may comprise one or more of a farmland condition sensor, e.g. a farmland slope sensor, or a crop condition sensor, e.g. a crop density or moisture content sensor. Measurement values from the sensor unit may be taken into account when predicting values for a field characteristic for generating the control signal.

An agricultural vehicle system according to embodiments of the present invention may furthermore comprise a first location specific memory for storing measurement values of one or more field characteristics. An agricultural vehicle system according to embodiments of the present invention may comprise a second location specific memory for storing model values of one or more field characteristics. The first and the second location specific memory may be physically one and the same memory.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 10, FIG. 12, FIG. 14 and FIG. 16 illustrate one region of the grid, in which previously determined values, e.g. measurement values or calculated values, are available; and FIG. 11, FIG. 13, FIG. 15 and FIG. 17 respectively illustrate on top thereof model values as determined by means of a model in accordance with embodiments of the present invention.

Figure 1:
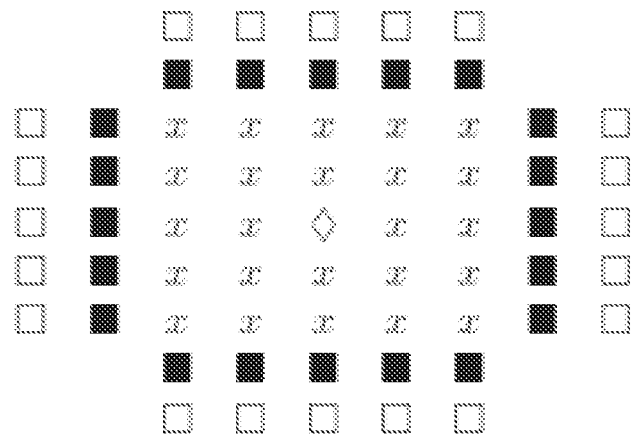
FIG. 1 illustrates values around a current location of an agricultural vehicle, which values may be taken into account for determining model values in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention is for use with agricultural vehicle systems. Agricultural vehicle systems are motorized vehicles designed for performing a particular agricultural task, e.g. harvesting machinery such as combine or forage harvesters, plows or fertilizer spreaders. Agricultural vehicle systems in embodiments of the present invention include any agricultural vehicle that performs site-specific measurements relating to field characteristics, e.g. farmland conditions such as topography, farmland slope, soil moisture, soil type, or crop conditions, such as crop density, toughness of the crop, moisture content, crop height. The field characteristics in accordance with embodiments of the present invention are characteristics of the environment, external to the agricultural vehicle system, but which nevertheless affect the performance of the agricultural vehicle system.

Examples of relevant field characteristics are given below, the list not being exhaustive:

Farmland slope: It has been shown that, at least for some agricultural vehicle systems, agricultural vehicle capacity, e.g. the effective combine capacity, decreases uphill, because the cleaning losses increase. If the slope information is available, the agricultural vehicle system, e.g. combine, can slow down before the losses actually increase. If the agricultural vehicle system delays the slowing down till the losses are actually measured to increase, it always responds too late. Because of the delay for crop processing and cleaning it takes quite some time before the losses return to their normal levels.

Crop density: The crop density may vary throughout the field because of environmental parameters such as e.g. varying sunlight conditions, different soil types and varying fertilizer distribution. If the crop density in front of the machine is known, the controller can anticipate on crop density variations just like an operator would based on his upfront view of the field.

Moisture content: The moisture content of the crop has significant impact on the threshing and cleaning process. Normally the moisture content is measured in the grain elevator, after the cleaning process. This means that it is impossible to adjust the threshing and cleaning system on time. By predicting the moisture content based on earlier measurements, it is possible to timely adjust the machine settings.

These are just a few examples of biological and farmland variables that can be predicted based on earlier measurements.

An agricultural vehicle system according to embodiments of the present invention is provided with a control system for controlling the operation thereof. Controlling the operation of the agricultural vehicle system may include controlling a vehicle system driving parameter such as vehicle travel speed, through the control of the engine speed or transmission ratio, or controlling a vehicle system attribute parameter, such as processing rotor speed, sieve opening size, cleaning fan speed, fertilizer flow.

To make sure that e.g. crop processors receive sufficient power from a relatively fixed power budget of an agricultural vehicle system to efficiently process crop with acceptable loss rates, it may be desirable to control vehicle speed as a function of the power demand or of the load of the crop processors. Thus, vehicle speed is preferably reduced as a vehicle enters areas of a field with dense crop conditions and is increased as the vehicle enters areas with sparse crop conditions. Maximum efficiency is achieved by setting vehicle speed as high as possible while maintaining acceptable loss rates or threshing performance. Preferably the controller anticipates on the field characteristics, and hence anticipates by decreasing or increasing the vehicle speed.

In order to obtain this anticipation, embodiments of the present invention focus on adding a location specific memory to a control system of an agricultural vehicle system in accordance with embodiments of the present invention. Measurement values of one or more field characteristics are stored in the location specific memory. Hereto, the agricultural vehicle system or the control system thereof is provided with a location sensor, e.g. a GPS device. Based on the sensed locations, the corresponding measurement values of the one or more field characteristics are stored in the location specific memory.

In this way the results of measurements of field characteristics, such as crop conditions, e.g. crop density, and/or farmland conditions, e.g. slope, performed by an agricultural vehicle system on one location can be used to predict the field characteristics on a neighboring location. Based on these earlier measurements the field characteristic in front of the combine harvester may be predicted.

Location information such as GPS location measurements, including latitude and longitude measurements, and GPS altitude measurements may be used. Based on these location measurements, in accordance with embodiments of the present invention, it is possible to predict field characteristics, e.g. the slope of the farmland. It is to be noted that the accuracy of any GPS system is much lower in the vertical direction than in the horizontal direction. The performance of the model may be improved by including the inclination measurements, on the agricultural vehicle system, e.g. from a longitudinally arranged sensor, and/or by including differential correction.

Figure 19:
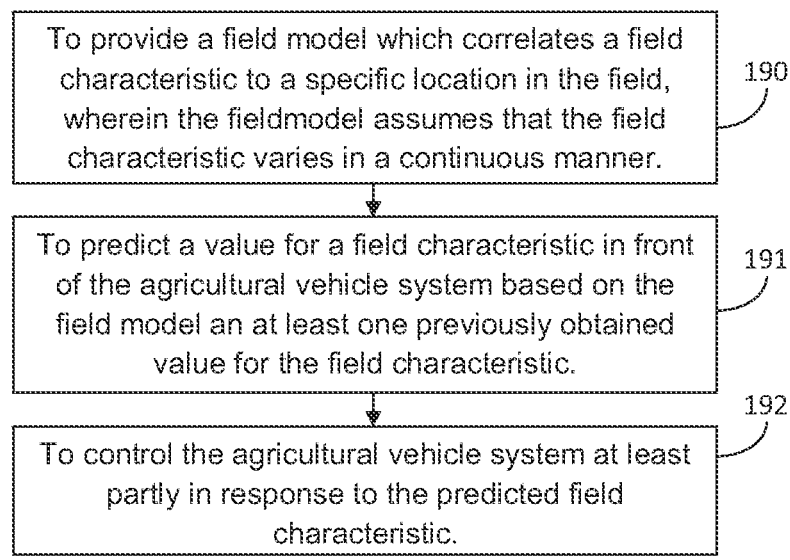
FIG. 19 is a flow diagram schematically illustrating the basics behind a method according to embodiments of the present invention.

A flow chart of a method according to embodiments of the present invention is illustrated in FIG. 19.

In accordance with embodiments of the present invention, in order to be able to obtain the predictions, a field model is provided, as illustrated in step 190 of FIG. 19. The field model correlates a field characteristic, e.g. farmland condition such as farmland slope, or crop condition such as crop density or moisture, to a specific location in the field. The field model is a mathematical expression of the behavior, e.g. variation, of at least one field characteristic over the field. The purpose of this field model is to predict field characteristics such as crop condition and/or farmland condition, e.g. characteristics of the crop (biological) and the farmland (topographic). The field characteristics, which may for example represent harvest properties, may be predicted at least for locations in front of the agricultural vehicle system, based on earlier measurements near the current location and/or based on earlier predicted field characteristic values near the current location. The predicted field characteristics in front of the agricultural vehicle system may be used to anticipate in the control of the agricultural vehicle system, e.g. of the vehicle speed or of crop processing settings such as rotor speed, sieve openings, cleaning fan speed, etc.

The field model according to embodiments of the present invention is assumed to always show the following characteristics:

The measurement values of the field characteristics are not exact, but are corrupted by noise, including sensor noise and/or process noise.

On locations where no measurements are performed the field characteristics to be predicted are linked to the field, and not to the state of the agricultural vehicle system. In other words, if a variable has a certain value at location A, it will have a similar value at all locations B which are in the vicinity of location A, independent of the state of the agricultural vehicle system.

The field characteristics vary in a continuous manner; no sudden changes of the field characteristics are possible.

The field characteristic is a measurement of some biological or topographic quantity, which implies that one can assume a smooth first derivative, implying a minimal second derivative.

On the agricultural vehicle system a location sensor providing position information, e.g. GPS position information, is available such that the measurements of the field characteristics can be related to an actual location in the field. The above assumptions aid in selecting a suitable model structure.

An approach taken in accordance with embodiments of the present invention is to fit a model to the field measurements, and to update this model online. Since the shape of a field characteristic, e.g. a biological variable, across a field may be very blurred, it is advantageous to use a numerical model rather than an analytical model.

Figure 8:
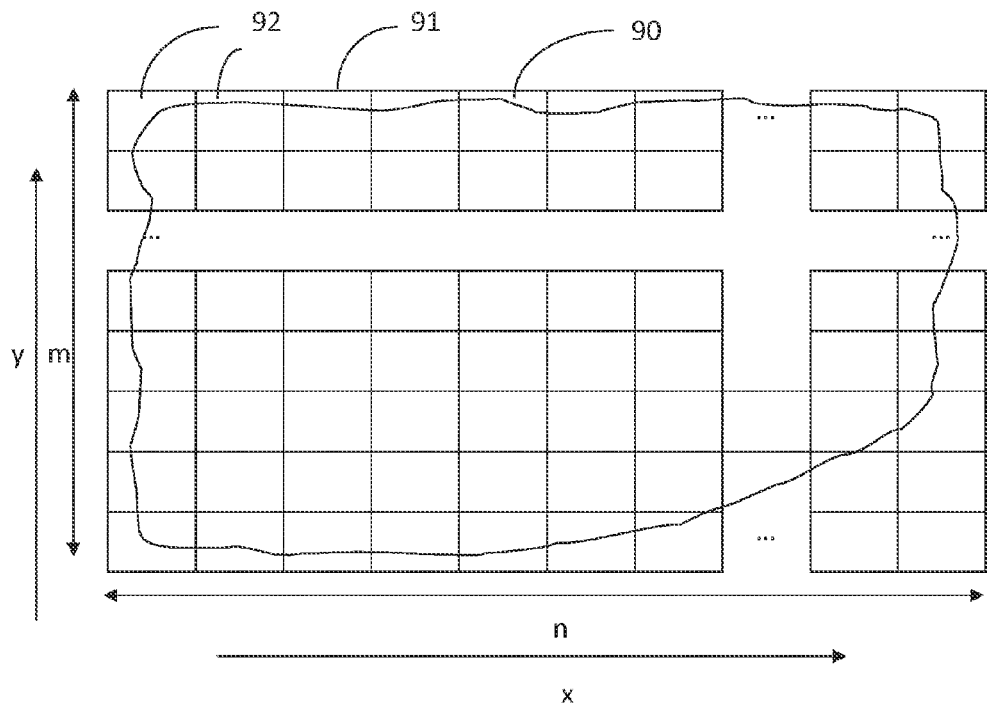
FIG. 8 illustrates an exemplary field to be worked, overlaid with a grid of n×m elements.
Figure 9:
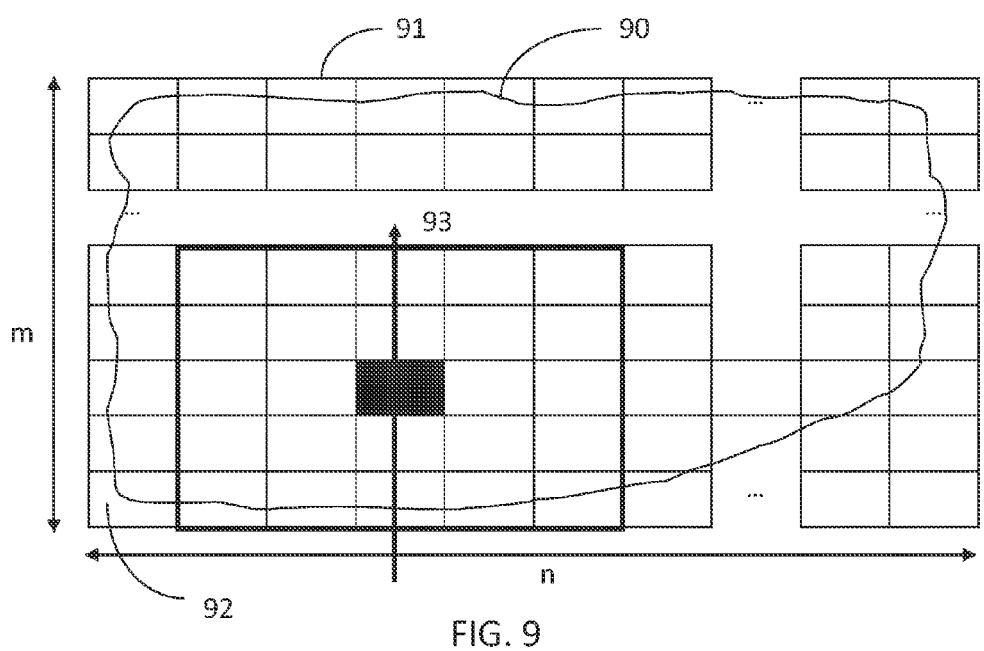
FIG. 9 illustrates the field to be worked as illustrated in FIG. 8, wherein a region with a pre-determined span around a current location of an agricultural vehicle is illustrated, which region is used for calculating field characteristic values of the elements within the region with the pre-determined span.

Fitting a field model to field measurements may include firstly defining a grid. This is illustrated in FIG. 8, where a field 90 is illustrated and a grid 91 overlaying the field 90. The grid is an array, for example a regular array, of grid elements 92 with a predetermined resolution, for instance a resolution of 1 meter, of 5 meter, or of 10 meter. The resolution of the elements 92 of the grid 91 may depend, but does not need to depend, on the working width of the agricultural vehicle system. The resolution of the elements 92 may correspond, but does not need to correspond, to the working width of the agricultural vehicle system. For example, the operator of a combine harvester commonly uses a working width which is slightly smaller than the width of the grain or corn header. The elements 92 in the grid 91 are arranged along a first direction x and along a second direction y perpendicular to the first direction. The resolution of the elements 92 of the grid 91 may be, but does not need to be, the same in both the first direction x and the second direction y. The grid 91 may comprise e.g. n elements 92 in the first direction x and m elements 92 in the second direction y. The elements 92 are selected such that a grid 91 at least overlaying the field 90 is obtained. In particular embodiments, the grid may be rectangular, which is computationally efficient. In alternative embodiments, the grid may for example be hexagonal, or may have any other suitable shape.

In embodiments of the present invention, the grid grows as the agricultural vehicle system moves into new locations. Nevertheless, in advantageous embodiments, the grid may, however, always stay rectangular, meaning that some of the grid elements may fall outside the field. To minimize computational overhead, the grid may grow in steps of a predetermined number of elements at a time, e.g. when the driver starts driving along a new column, the grid may grow with m elements, or when the driver starts driving along a new row, the grid may grow with n elements.

In a particular implementation, the grid may be defined by the driver first driving around the field.

The direction of the grid, e.g. rectangular grid, at initialization may be assumed to be along the north-south axis. After all, at the start, the main direction of the field may not be known to the system, hence any direction may be selected for the orientation of the grid.

The selection of the grid 91 leads to a matrix F, of which each element is a model value at one point, i.e. in one region 92, of the grid 91. The model according to embodiments of the present invention is a very flexible model: the model can take on any shape because it is not a function, but a collection of model values with predefined relations between all these values.

In a next step, the model values of the matrix F may be calculated and stored in the location specific memory. In particular, from the field model and at least one previously obtained model value, a value for the field characteristic in front of the agricultural vehicle system may be predicted, e.g. calculated, as illustrated by step 191 of FIG. 19. The calculation of the model values (predicted values) in accordance with embodiments of the present invention takes the following effects into account:

Measurements: Measurements which have already been made, pull model values in the direction of the measured values. Each actual measurement is attributed to one position on the grid 91 (and thus in the matrix F). Nevertheless, the field measurements are not exact and are corrupted by noise such as sensor noise and/or process noise. If the field measurements would be exact, the model would pass through all the measurements. A model according to embodiments of the present invention does not do that. There may remain a considerable difference between a model value and a corresponding field measurement.

Minimal first derivative: In nature the curve of any object varies as little as possible. Things tend to level out. This also applies to field characteristics such as crop conditions, e.g. crop density, and farmland conditions, e.g. terrain slope. During the modeling phase the derivative between two neighboring model values is penalized. In other words, the model surface can only deviate from a plane if measurements pull sufficiently hard.

Minimal second derivative: In nature curves also vary smoothly. So, the first derivative should not change unless it is strictly necessary. Hence, in particular embodiments, also the second derivative between two neighbouring model values may be minimized. In alternative embodiments, more than two neighbouring model values may be taken into account for minimizing the second derivative.

Each of the above-mentioned effects has its importance, but of course, the effects need to be balanced with each other, which is a tuning exercise.

During use, the agricultural vehicle system is controlled at least partly in response to the predicted field value(s) in front thereof, as illustrated by step 192 of FIG. 19.

The above-presented approach is formalized in a mathematical description. First of all any measured values are discretized into a measurement matrix. Such transformation from geographically continuous measurement values to matrix elements may comprise the following steps:

1. Express GPS coordinates (latitude, longitude) in meters, e.g. by conversion of the GPS coordinates into the WGS84 Geodetic Coordinate system. In this way the position of the agricultural vehicle system may for example be expressed in meters with respect to the starting position of the agricultural vehicle system.

2. As the main direction of the field is not known in advance, in accordance with embodiments of the present invention, the matrix dimensions may be aligned with the North-South and East-West axis of the globe. In accordance with alternative embodiments, for example if an indication of the orientation of the field would be known in advance, any other suitable orientation may be taken as the main direction. The values of the x- and y-components of the first measurement in the field may be stored, for example as offsetx and offsety. This only happens when the first measurement value is added. At this time the offset is defined, such that all the measurements are relative to the first position in the field, as indicated under point 1 above.

3. The continuous coordinates are then transformed into discrete coordinates. The resolution of the measurement matrix may be set to a pre-determined resolution value. As an example, the resolution of the measurement matrix may be set to 5 meters. Of course the selection of the resolution of the measurement matrix is a trade-off between computation time and accuracy. However, most agricultural vehicle systems, such as e.g. combine harvesters, will normally not come closer than 5 meters to each other since most headers are wider than 5 meters. If several measurements relate to a same matrix element, an average measurement for that matrix element may be determined.

4. In embodiments of the present invention, the measurement matrix may be automatically enlarged when measurements outside the current measurement matrix are encountered.

Besides the measurement matrix, a model matrix is created, containing model values or thus predicted values, the model matrix having the same size as the measurement matrix. The model values may be obtained from an optimization problem, wherein a cost function of the model values is optimized, e.g. minimized.

In particular embodiments, as an example only, the cost function to be optimized sums, for each location in the grid, the weighted squared difference between the model value and a measured value at that location, the weighted squared first derivative in orthogonal directions of the model values and the weighted squared second derivatives in orthogonal directions of the model values:

$$\min f(a_{i,j}) = \frac{\beta_t}{\gamma_t} \sum_{i=0}^{N_i} \sum_{j=0}^{N_j} c_{i,j}(a_{i,j} - t_{i,j})^2 + \tag{1}$$

$$\frac{\beta_{\delta,i}}{\gamma_\delta} \sum_{i=-1}^{N_i} \sum_{j=-1}^{N_j} \left(\frac{\delta a_{i,j}}{\delta i}\right)^2 + \frac{\beta_{\delta,j}}{\gamma_\delta} \sum_{i=-1}^{N_i} \sum_{j=-1}^{N_j} \left(\frac{\delta a_{i,j}}{\delta j}\right)^2 +$$

$$\frac{\beta_{\delta^2,i}}{\gamma_{\delta^2}} \sum_{i=0}^{N_i} \sum_{j=0}^{N_j} \left(\frac{\delta^2 a_{i,j}}{\delta i^2}\right)^2 + \frac{\beta_{\delta^2,j}}{\gamma_{\delta^2}} \sum_{i=0}^{N_i} \sum_{j=0}^{N_j} \left(\frac{\delta^2 a_{i,j}}{\delta j^2}\right)^2$$

with $$\gamma_t = \sum_{i=0}^{N_i} \sum_{j=0}^{N_j} c_{i,j} \tag{2}$$

$$\gamma_\delta = (N_i + 2)(N_j + 2)$$

$$\gamma_{\delta^2} = (N_i + 1)(N_j + 1)$$

where $a_{i,j}$ is the model value, or thus the predicted value, at position (i,j), $t_{i,j}$ the measured value at the same position and $c_{i,j}$ indicates if a measurement is available at the position (i, j). All these different terms may be weighted, which is done by the parameters $\beta_t$, $\beta_{\delta,i}\beta_{\delta,j}$, $\beta_{\delta^2,i}$ and $\beta_{\delta^2,j}$. Normally the weighing factors are taken identical for both directions (i and j), corresponding to the orthogonal directions x and y as illustrated in FIG. 8. Thus the number of parameters to be tuned may be reduced to three, namely $\beta_t$ to weigh the measured values, $\beta_\delta$ to weigh the first order derivative and $\beta_{\delta^2}$ to weigh the second order derivative. The initial values of the weighting parameters can be determined based on physical knowledge of the values of these derivatives. These values may then further be improved by tuning (trial and error method around the initial values).

Since the number of target value terms varies, depending on the environment of the agricultural vehicle system, all terms may first be normalized with $\gamma_t$, $\gamma_\delta$ and $\gamma_{\delta^2}$, and then weighted with their respective factors. One could add an additional requirement to these weighting parameters without loss of generality, namely:

$$\beta_t + \beta_\delta + \beta_{\delta^2} = 1 \quad (3)$$

which reduces the number of independent parameters to be tuned to two. The first derivatives of equation (1) may be defined as:

$$\frac{\delta a_{i,j}}{\delta i}(k, l) = \frac{a_{k+1,l} - a_{k,l}}{2} \quad (4)$$

$$\frac{\delta a_{i,j}}{\delta j}(k, l) = \frac{a_{k,l+1} - a_{k,l}}{2} \quad (5)$$

The second order derivatives may be defined as:

$$\frac{\delta^2 a_{i,j}}{\delta i^2}(k, l) = \frac{1}{2}\left(\frac{a_{k+1,l} - a_{k,l}}{2} - \frac{a_{k,l} - a_{k-1,l}}{2}\right) \quad (6)$$

$$\frac{\delta^2 a_{i,j}}{\delta j^2}(k, l) = \frac{1}{2}\left(\frac{a_{k,l+1} - a_{k,l}}{2} - \frac{a_{k,l} - a_{k,l-1}}{2}\right) \quad (7)$$

It is to be noted that in equation (1) the first and second order derivatives also take into account points surrounding the measurement (or model) matrix. In general, from the equations defining the first and second order derivatives, i.e. equations (4), (5), (6) and (7), follows that the model values near the area to be optimized are also taken into account.

In particular embodiments, special precautions may be taken to either:
- use the model values outside the current measurement matrix, being a subset of the measurement matrix defined by the model span for example as illustrated in FIG. 1;
- or, to modify the functions as defined by equation (1) such that the derivatives only take values inside the measurement matrix into account. This is the default situation if no model values outside the measurement matrix are known.

The above and other border conditions may be taken into account, and a plurality of possible implementations exist.

Optimizing, e.g. minimizing, the cost function shown in equation (1) comes down to solving the following system of equations:

$$\begin{cases} \frac{\delta f(a_{i,j})}{\delta a_{1,1}} = 0 \\ \frac{\delta f(a_{i,j})}{\delta a_{1,2}} = 0 \\ \vdots \\ \frac{\delta f(a_{i,j})}{\delta a_{2,1}} = 0 \\ \vdots \\ \frac{\delta f(a_{i,j})}{\delta a_{N_i,N_j}} = 0 \end{cases} \quad (8)$$

In other words, for each model value, a linear equation is added to the system.

As an example the second order derivative along the i direction of equation (6) is considered. The following notational convention may be used:

$$a_l = a_{k+1,l}$$

$$a_c = a_{k,l}$$

$$a_r = a_{k-1,l} \quad (9)$$

where $a_l$ stands for the left element, $a_c$ the central element and $a_r$ the right element. For every element of the model matrix, there is a term like equation (6) in equation (1). As shown in equation (8), the derivative of equation (1) needs to be calculated for each model value. If only the second derivative along the i direction is taken into account, this already leads to three components in the derivative of the model value $a_{i,j}$. After all, $a_{i,j}$ can be the left, central or right element of equation (6).

First of all, the derivatives of equation (6) to $a_{i,j}$, $a_c$ and $a_r$ are to be calculated; this yields, except for a constant factor which does not influence the result:

$$\frac{\delta}{a_l}\left(\left(\frac{\delta^2 a_{i,j}}{\delta i^2}\right)^2\right) = 0.5 a_l - a_c + 0.5 a_r \quad (10)$$

$$\frac{\delta}{a_c}\left(\left(\frac{\delta^2 a_{i,j}}{\delta i^2}\right)^2\right) = 2 a_c - a_l - a_r$$

$$\frac{\delta}{a_r}\left(\left(\frac{\delta^2 a_{i,j}}{\delta i^2}\right)^2\right) = 0.5 a_l - a_c + 0.5 a_r$$

Now, the contribution of the second derivative in the i-direction as given in equation (6), to the derivative of equation (1) to $a_{i,j}$ is calculated, with $a_{i,j}$ a model value in the middle of the model matrix (no boundary effects). This can be summarized in Table 1. The effect of the other terms of equation (1) is calculated analogously, but not illustrated below.

TABLE 1

The contribution of equation (6) to the derivative of equation (1) to $a_{i,j}$. The contributions of $a_l$, $a_c$ and $a_r$ in equation (10) are listed separately.

|       | $a_{k-2,l}$ | $a_{k-1,l}$ | $a_{k,l}$ | $a_{k+1,l}$ | $a_{k+2,l}$ |
|-------|-------------|-------------|-----------|-------------|-------------|
| $a_l$ |             |             | 0.5       | −1          | 0.5         |
| $a_c$ |             | −1          | 2         | −1          |             |
| $a_r$ | 0.5         | −1          | 0.5       |             |             |
| TOTAL | 0.5         | −2          | 3         | −2          | 0.5         |

It is an advantage of a model in accordance with embodiments of the present invention that it has the capability to make a smooth extrapolation of the field towards unvisited areas. Of course, the extrapolation values are only a best guess since there are no actual measurements, but they give an idea what to expect in that area. This may be very useful to optimize the operation of an agricultural vehicle system such as for example a combine harvester.

Online application of a method according to embodiments of the present invention adds two extra requirements to the method as set out above, namely:

The computational complexity has to be acceptable. Online application requires the algorithm to run at regular time intervals, for instance once every 10 seconds. Thus it has to be feasible to perform the complete calculation within that time frame on hardware available on the agricultural vehicle system.

A system of updates has to be devised, to allow adding new information (measurement values) to the existing model. As new measurements become available, the model of the field is updated recursively.

The major computational cost in the model is solving the system of equations as proposed in equation (8). In order to be able to perform the model update online within the pre-determined, limited time interval, the system size has to be limited. One solution thereto is to only optimize the model values over part of the field 90. In other words, model values in the neighborhood of the current position of the agricultural vehicle system are updated, and the other model values already present are kept as boundary conditions.

For the second order derivative to work correctly, values for a span of at least two elements in all directions around the current position need to be taken into account. This is illustrated in FIG. 1, illustrating an embodiment wherein a range of exactly two values around the current position is taken into account. In FIG. 1, '◇' indicates the current position of the agricultural vehicle system, 'x' are locations of which the measurement value is taken into account, if present, '■'denotes positions of which the model value (if present) is used as boundary conditions for the first and second order derivatives, and '☐' denotes positions of which the model value (if present) is only used as boundary conditions for the second order derivative.

To have an idea of the feasibility of a model according to embodiments of the present invention in an online environment, the execution times are recorded for different ranges of the local model. These tests were performed in Matlab on a Windows XP machine (Intel 2.0 Gz, 1 GB RAM). It is to be noted that no efforts were made to optimize the implementation of the algorithm. The results are shown in Table 2.

TABLE 2

Computation time required for one update step of the algorithm for different model spans. A model span 2 means that two measurement values in every direction around the combine position are taken into account.

| Model span | Time (s) | | | | |
| --- | --- | --- | --- | --- | --- |
| | Mean | Std | Median | Min | Max |
| 2 | 0.0108 | 0.0073 | 0.0150 | 0 | 0.0150 |
| 3 | 0.0230 | 0.0078 | 0.0160 | 0.0150 | 0.0320 |
| 4 | 0.0502 | 0.0068 | 0.0470 | 0.0460 | 0.0780 |
| 5 | 0.1253 | 0.0078 | 0.1250 | 0.1090 | 0.1410 |
| 6 | 0.2816 | 0.0135 | 0.2810 | 0.2500 | 0.3130 |
| 7 | 0.7439 | 0.0315 | 0.7500 | 0.6560 | 0.8130 |

Figure 2:
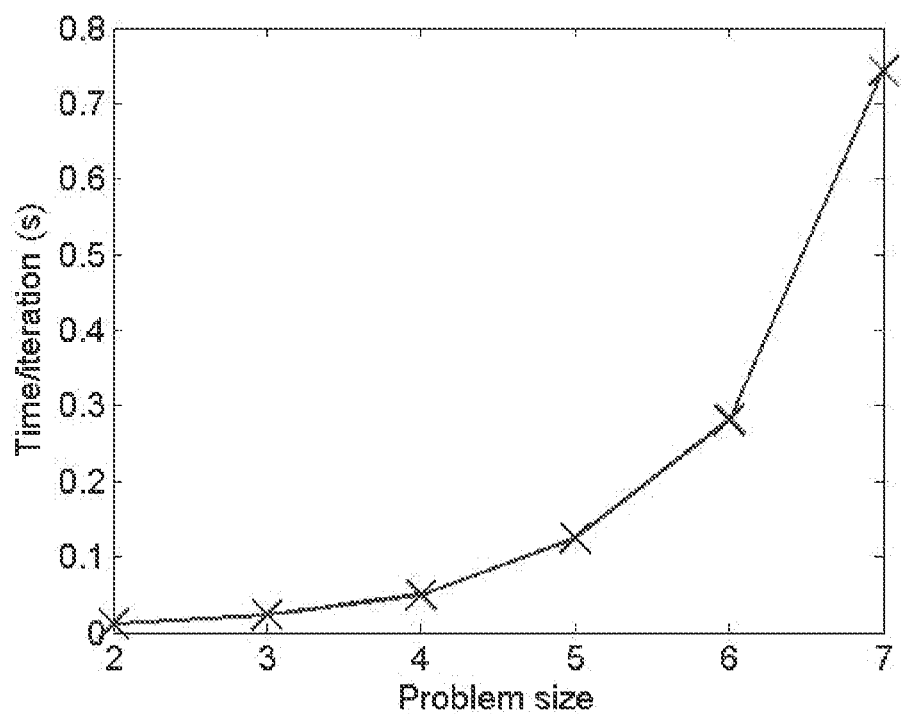
FIG. 2 is a graphical representation of the average execution times as presented in Table 2. A steep increase in computation time in function of the problem size is to be noted.

It is to be noted that the execution time is recorded with Matlab, which implies that very low times are not accurately measured. This is probably the reason why the standard deviation remains substantially constant for the first few model spans. The computation time is acceptable, but increases rapidly with model span increase. The average execution time doubles for each increment (with 1) of the model span. This can be expected, since the problem size (number of variables) increases quadratically with the model span, and the solution time of a system of equations is known to be $O(x^3)$ with x the number of variables. The average execution times are plotted in FIG. 2. The steep increase in computation time in function of the problem size is to be noted.

Tests have shown that a model span of 3 already yields quite good results (with a position resolution of 5 meter). Of course, if the resolution is increased, a larger model span will be needed to reach the same model characteristics.

Example

To illustrate the method according to embodiments of the present invention, GPS data from an actual field of a little over 1 ha are used. In the embodiment illustrated, the field characteristic being the field profile is modeled based on the coordinates and the altitude measurement of a GPS system installed on an agricultural vehicle. Of course, in accordance with embodiments of the present invention, a similar method can be used to model for instance crop conditions such as crop density.

Figure 3:
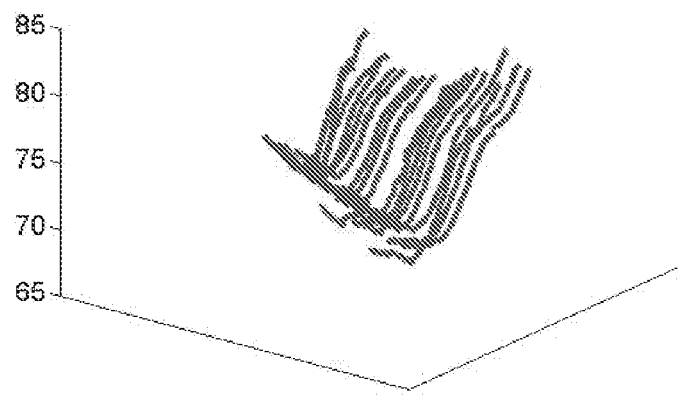
FIG. 3 illustrates GPS height measurement of a field.
Figure 4:
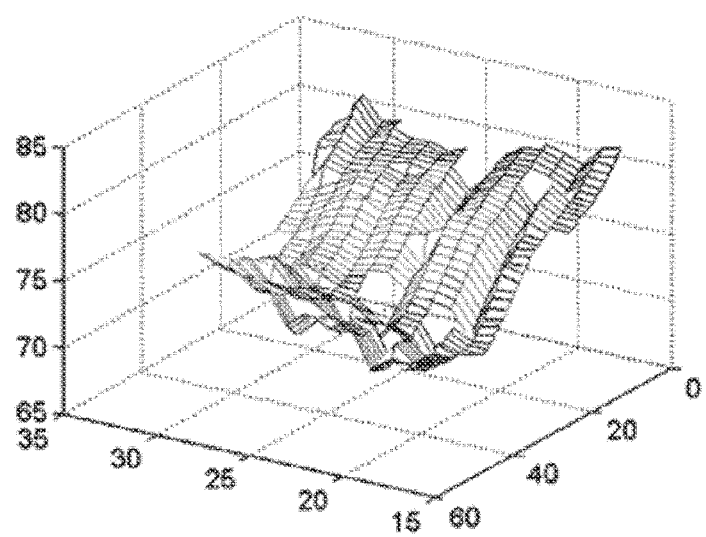
FIG. 4 illustrates a mesh representation of the field of which the GPS height measurements are illustrated in FIG. 3.

The measured altitudes of the field used in the example are shown in FIG. 3 and FIG. 4. FIG. 3 is a plot of the measured points, and FIG. 4 is a corresponding mesh representation. The measured field clearly has a sink in the middle.

In accordance with embodiments of the present invention, a grid is defined over the field. The grid has a pre-determined resolution. In the embodiment illustrated, the resolution of the grid is set to 5 meters. With this resolution, the measured field of the example leads to a grid matrix of about 15 by 40 elements.

A model as expressed by Eq. (1) is used. This model is applied to elements of the grid which lie within a pre-determined span around a current location of the agricultural vehicle system working the field. As an example, for the implementation illustrated a span of 3 values is used. This means that in every time step the model values in an area of 7×7 $(2\times3+1)^2$ elements of the grid are optimized. Experiments have shown that there is little or no benefit in using larger equation spans. This follows from the mathematical description, which defines the field behavior very locally. This local approach is necessary to obtain an accurate description of a heavily non-linear surface as for example shown in FIG. 3.

Figure 5:
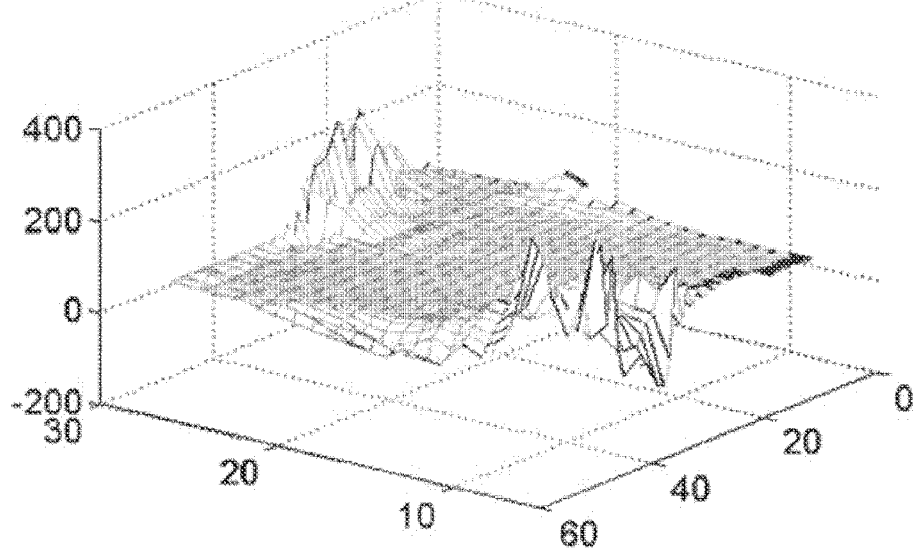
FIG. 5 illustrates a first embodiment of a field model of the present invention with a small first derivative term in the objective function, i.e. in the cost function that is optimized.
Figure 6:
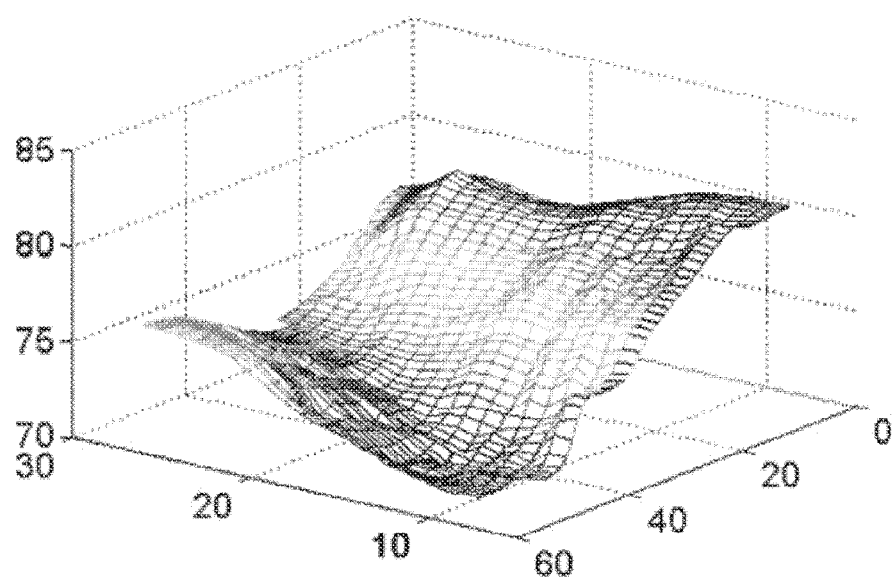
FIG. 6 illustrates a second embodiment of the field model of the present invention with a larger first derivative term compared to the model as illustrated in FIG. 5. The first derivative term clearly stabilizes the model.

The second order derivative term in the description (cfr. Equation (1)) is actually the most important term for describing the field properties. It makes sure that the profile of the field model is smooth. However, the second order term also may give rise to instability. If there are two values, and one is larger than the other, the second order term will predict a (sometimes steep) slope. The first order derivative term guarantees stability. This is illustrated in FIG. 5 and FIG. 6, in which the model is shown with all the field data incorporated. In FIG. 5, a very small weight parameter for the first derivative is chosen, in FIG. 6 a 5 times larger first derivative weight is used. The model of FIG. 5 is clearly unstable, while the model of FIG. 6 predicts the field more accurately.

Figure 7:
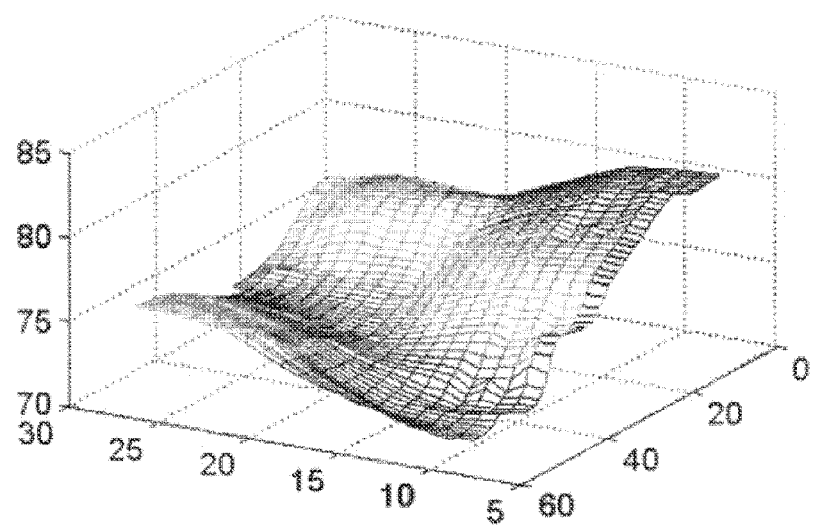
FIG. 7 illustrates a third embodiment of the field model of the present invention with a reduced weight for the measurements, which leads to a smoother model.

Of course, another useful component is the relative weight of the measurements themselves (first term in Equation (1)). The weighting parameters yielding the best field model are constant for most field reliefs, but may depend on the span of the matrix. As mentioned above, for the example illustrated, the surface still appears a bit too sharp. The model used for the experiment is not as smooth as it should be in the areas where measurements are present, as the parameters were not optimized. This can be improved by changing the weighting parameters $\beta_t$, $\beta_{\delta,i}$, $\beta_{\delta,j}$, $\beta_{\delta^2,i}$, and $\beta_{\delta^2,j}$ of equation (1). The effect of tuning the weighting parameters is illustrated in FIG. 7, which shows the model with a reduced weight of the measurements. This clearly yields a smoother surface.

Example

In the following, a few schematic examples are illustrated of how a model in accordance with embodiments of the present invention may be applied to a grid overlaying a field.

As an example, a field 90 to be worked is provided, e.g. overlaid, with a grid 91, e.g. a grid of n×m elements with each a predetermined resolution of e.g. 5 meter by 5 meter, as illustrated in FIG. 8. Over time, during a time period during which an agricultural vehicle system works the field, the elements of the grid 91, in accordance with embodiments of the present invention, are filled with values representing a field characteristic. The field characteristic may for example be farmland slope, but the invention is not limited thereto. In accordance with embodiments of the present invention, when an agricultural vehicle system passes over the elements, values for the field characteristic are determined by measurement. At the same time, values representing the field characteristic for surrounding elements within a span around the current location of the agricultural vehicle system are determined by calculation from the model. This is illustrated in FIG. 9 to FIG. 17.

When an agricultural vehicle system starts a first pass 93 through the field 90 (FIG. 9), none of the elements has been accorded a value for the field characteristic yet. The agricultural vehicle system is provided with a sensor to measure a value for the field characteristic of the element where it passes. In the example illustrated, the agricultural vehicle system may for example be provided with a GPS system for measuring altitude of the agricultural vehicle system.

Figure 10:
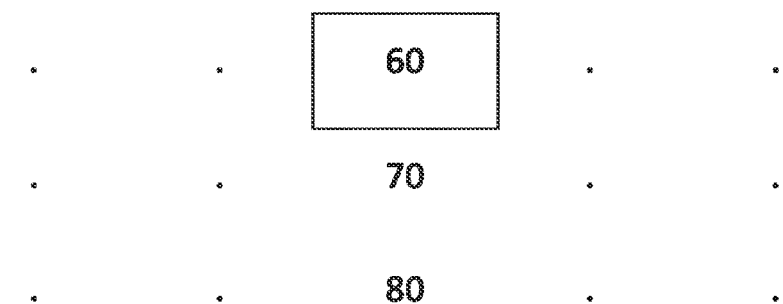
Figure 11:
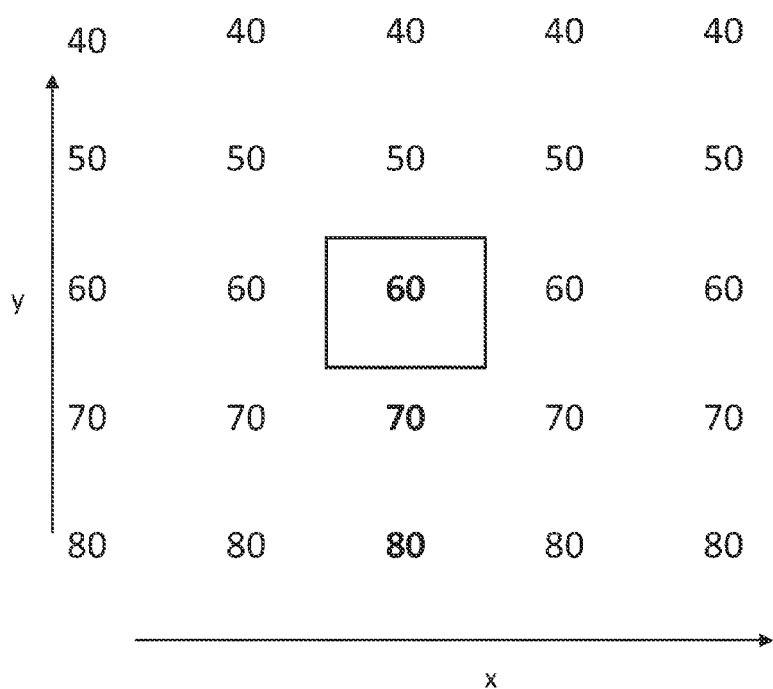

FIG. 10 illustrates the situation where only three measurements have been made in a region with span 2 around the current location of the agricultural vehicle system, this current location being indicated by the square. Based on these three measurement values, the values for the field characteristic of the remaining elements in the region are calculated, and the result is illustrated in FIG. 11. The model according to embodiments of the present invention is such that it takes into account that the field characteristic varies in a continuous manner. Hence in the travel direction of the agricultural vehicle system (y-direction), where the three measurements made indicate a decrease of the field characteristics, e.g. a downward slope, the model for calculating the non-measured values in accordance with embodiments of the present invention will predict a continuously decreasing field characteristic as illustrated in FIG. 11. In the other direction (x-direction), perpendicular to the movement direction, where no measurement values nor earlier predicted values are present, the minimal first derivative will lead to same values of the field characteristics as the values already present in the middle column. The result is illustrated in FIG. 11.

FIG. 12 illustrates a situation in which, during a previous pass, the measurement value indicated at the top of the region with span 2 around the current location of the agricultural vehicle system has been determined. During the current pass, when the agricultural vehicle system drives through the field, measurement values as indicated in the remainder of the region illustrated have been determined. The corresponding values in the region with span 2 around the actual position of the agricultural vehicle system (indicated by the square) are determined by calculation from the model according to embodiments of the present invention. The measurement values as illustrated in FIG. 12 indicate that, in movement direction, there is first a decrease in the field characteristic, and then a leveling of the field characteristic. FIG. 13 illustrates, besides the measured values (in bold) also the values as calculated from the model. The model according to embodiments of the present invention is such that it takes into account that the field characteristic varies in a continuous manner. It can be seen from FIG. 13 that the calculated values, in a direction perpendicular to the movement direction, take the same values as the measured values at corresponding level.

Figure 14:
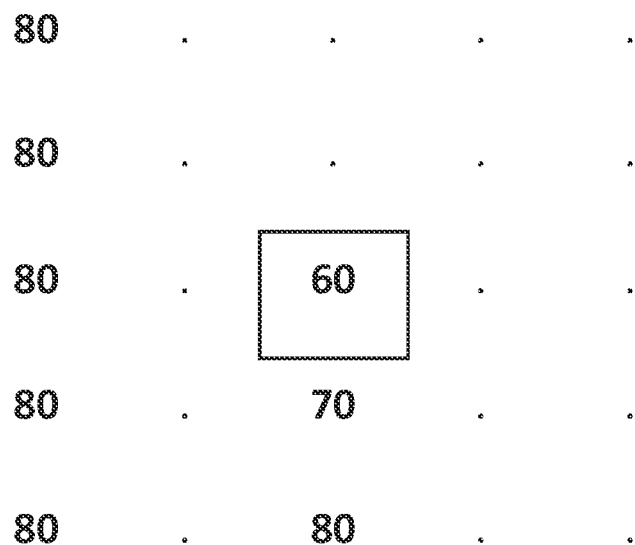

FIG. 14 illustrates a region of which one column of values has been determined before. As an example only, the left hand column may be values determined e.g. by calculation during a previous pass of the agricultural vehicle system a few columns aside. The middle column of values may be determined by measurement by the agricultural vehicle system passing over the elements in this column.

Figure 15:
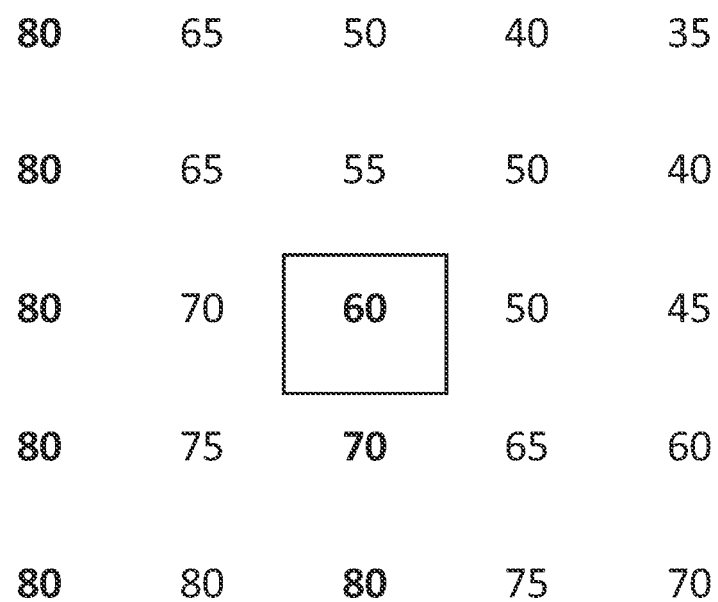

FIG. 15 illustrates, besides the values already known earlier, also the values determined according to the field model correlating a field characteristic, e.g. farmland condition such as farmland slope, or crop condition such as crop density or moisture, to a specific location in the field. The field model according to embodiments of the present invention is such that it takes into account that the field characteristic varies in a substantially constant manner. The field characteristic in front of the agricultural vehicle system is predicted (calculated) to continue to decrease, but in view of the measured constant high values in the left hand column, the decrease in the middle column is reduced with respect to the decrease behind the agricultural vehicle system (derivatives between neighbouring values in the span are minimized). If not, the change in value of the field characteristic in a direction perpendicular to the direction of movement of the agricultural vehicle system would not be in a substantially constant manner.

Figure 16:
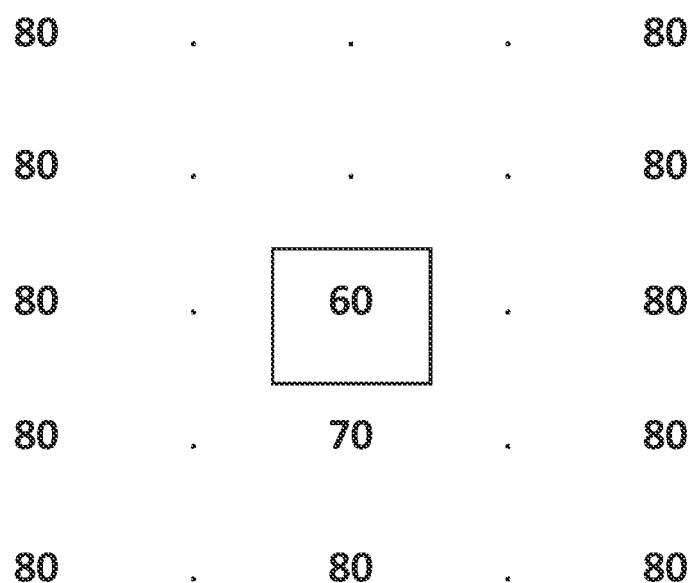
Figure 17:
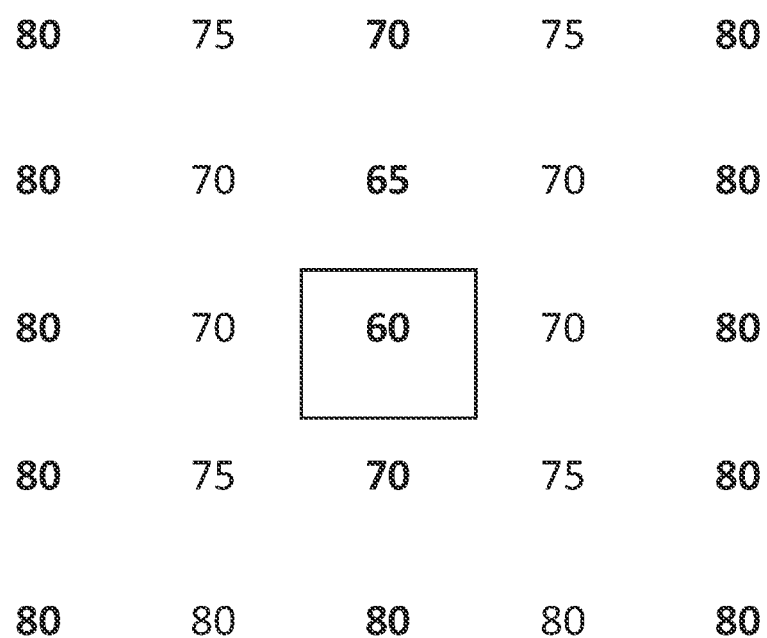

FIG. 16 illustrates a region with span 2 in which two columns of values are known, in the embodiment illustrated the left hand and right hand columns of the region. When an agricultural vehicle system passes over the middle column of the region, and is present in the centre of the region, as indicated by the square, the unknown values of the region are determined, i.e. calculated by fitting the model in accordance with embodiments of the present invention to the grid. Derivatives between neighbouring values in the span are minimized in both directions. The resulting values are illustrated in FIG. 17.

Figure 18:
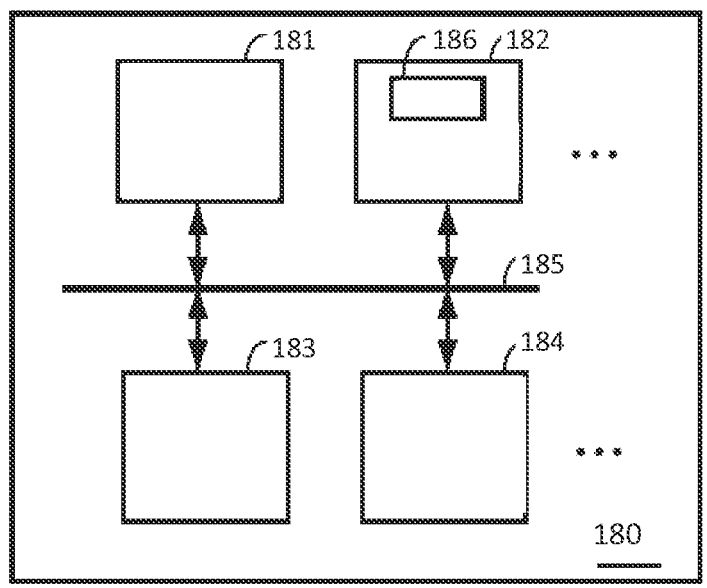
FIG. 18 schematically illustrates a processing system including at least one programmable processor which may be programmed so as to perform a method according to embodiments of the present invention.

The above-described method embodiments of the present invention may be implemented in a processing system such as illustrated in FIG. 18, which shows a configuration of processing system 180 that includes at least one programmable processor 181 coupled to a memory subsystem 182 that includes at least one form of memory, e.g., RAM, ROM, and so forth. It is to be noted that the processor 181 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system 180 may include a storage subsystem 183 that has at least one disk drive and/or CD-ROM drive and/or DVD drive. In some implementations, a display system, a keyboard, and a pointing device may be included as part of a user interface subsystem 184 to provide for a user to manually input information, such as for example grid dimensions. Ports for inputting and outputting data also may be included. More elements such as interfaces to various devices, and so forth, may be included, but are not illustrated in FIG. 18. The various elements of the processing system 180 may be coupled in various ways, including via a bus subsystem 185 shown in FIG. 18 for simplicity as a single bus, but will be understood to those in the art to include a system of at least one bus. The memory of the memory subsystem 182 may at some time hold part or all (in either case shown as 186) of a set of instructions that when executed on the processing system 180 implement the steps of the method embodiments described hereinabove. Thus, while the hardware of a processing system 180 such as shown in FIG. 18 is prior art, a system that includes the instructions to implement aspects of the methods for controlling the agricultural vehicle system is not prior art, and therefore FIG. 18 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media include, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computing device can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A method for controlling an agricultural vehicle system when moving along a course of travel over a field, the method comprising:
providing a field model correlating a field characteristic to a specific location in the field,
from the field model and at least one previously obtained value for the field characteristic, predicting a value for the field characteristic in front of the agricultural vehicle system thus obtaining an anticipated field characteristic, and
controlling the agricultural vehicle system at least partly in response to the anticipated field characteristic,
wherein providing the field model correlating a field characteristic to a specific location in the field includes assuming that field characteristic varies in a continuous manner by taking into account first and second order derivatives of the field model variables; and
wherein the previously obtained value for the field characteristic is from a location different than the location in front of the machine for which the value of the field characteristic is predicted.

2. A method for controlling an agricultural vehicle system when moving along a course of travel over a field the method comprising:
providing a field model correlating a field characteristic to a specific location in the field,
from the field model and at least one previously obtained value for the field characteristic, predicting a value for the field characteristic in front of the agricultural vehicle system thus obtaining an anticipated field characteristic, and
controlling the agricultural vehicle system at least partly in response to the anticipated field characteristic,
wherein providing the field model correlating a field characteristic to a specific location in the field includes assuming that field characteristic varies in a continuous manner by taking into account first and second order derivatives of the field model variables and optimizing a cost function that takes account of the difference between a model value and a measured value at a specific location, of the first derivatives in orthogonal directions of the model values and of the second derivatives in orthogonal directions of the model values.

3. A method for controlling an agricultural vehicle system when moving along a course of travel over a field, the method comprising:
providing a field model correlating a field characteristic to a specific location in the field,
from the field model and at least one previously obtained value for the field characteristic, predicting a value for the field characteristic in front of the agricultural vehicle system thus obtaining an anticipated field characteristic, and
controlling the agricultural vehicle system at least partly in response to the anticipated field characteristic,
wherein providing the field model correlating a field characteristic to a specific location in the field includes assuming that field characteristic varies in a continuous manner by taking into account first and second order derivatives of the field model variables and summing a factor related to the squared difference between a model value and a measured value at a location in the field, a factor related to the squared first derivative in orthogonal directions of the model values and a factor related to the squared second derivatives in orthogonal directions of the model values.

4. A method according to claim 3, wherein providing the field model includes weighting the factors before summing.

5. A method for controlling an agricultural vehicle system when moving along a course of travel over a field, the method comprising:
providing a field model correlating a field characteristic to a specific location in the field, from the field model and at least one previously obtained value for the field characteristic, predicting a value for the field characteristic in front of the agricultural vehicle system thus obtaining an anticipated field characteristic, and controlling the agricultural vehicle system at least partly in response to the anticipated field characteristic, wherein providing the field model correlating a field characteristic to a specific location in the field includes assuming that field characteristic varies in a continuous manner by taking into account first and second order derivatives of the field model variables; and wherein predicting the value for the field characteristic in front of the agricultural vehicle system includes calculating field characteristic values in a region around a current location of the agricultural vehicle system determined by a span not larger than 6 columns of known values.

6. A method according to claim 1, wherein predicting the value for the field characteristic in front of the agricultural vehicle system includes updating the model of the field as new measurements become available.

7. A method according to claim 1, furthermore comprising fitting a grid over the field, the grid consisting of a plurality of elements, and determining a value for the field characteristic of the elements of the grid.

8. A method according to claim 7, wherein the fitting the grid over the field includes fitting the grid over the field with a resolution determined by the working width of an appliance of the agricultural vehicle system.

9. An agricultural vehicle system comprising a control system configured to generate a control signal from a predicted value for a field characteristic in front of an agricultural vehicle, the predicted value being calculated by the control system from a field model correlating the field characteristic to a specific location in the field and at least one previously obtained value for the field characteristic, wherein the field model assumes that the field characteristic varies in a continuous manner; and wherein the previously obtained value for the field characteristic is from a location different than the location in front of the agricultural vehicle for which the value of the field characteristic is predicted.

10. An agricultural vehicle system according to claim 9, the control system is configured to control for-the vehicle system driving parameter or a vehicle system attribute parameter.

11. An agricultural vehicle system according to claim 9, furthermore comprising a sensor unit configured to measure the field characteristic.

12. An agricultural vehicle system according to claim 11, wherein the sensor unit includes-at least one-of a farmland condition sensor and a crop condition sensor.

13. An agricultural vehicle system according to claim 9, furthermore comprising a location specific memory configured to store measurement values of one or more field characteristics.

\* \* \* \* \*